US 6,538,826 B2

(12) United States Patent
Koiwai et al.

(10) Patent No.: US 6,538,826 B2
(45) Date of Patent: Mar. 25, 2003

(54) LENS BARREL

(75) Inventors: Tamotsu Koiwai, Tokyo (JP); Ai Midorikawa, Saitama (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 10/114,961

(22) Filed: Apr. 2, 2002

(65) Prior Publication Data

US 2003/0002173 A1 Jan. 2, 2003

(30) Foreign Application Priority Data

Jun. 28, 2001 (JP) .................................. 2001-196952

(51) Int. Cl.$^7$ .............................................. G02B 15/14
(52) U.S. Cl. ...................................... 359/700; 359/699
(58) Field of Search .................................. 359/699, 700, 359/701, 703, 704

(56) References Cited

U.S. PATENT DOCUMENTS

| 3,897,998 | A | * | 8/1975 | Someya et al. ............ 359/699 |
| 4,272,160 | A | * | 6/1981 | Uesugi ....................... 359/700 |
| 4,707,083 | A | * | 11/1987 | Iizuka et al. ................ 359/700 |
| 4,989,950 | A | * | 2/1991 | Nakauchi ................... 359/818 |
| 6,198,578 | B1 | * | 3/2001 | Iwasa et al. ................ 359/699 |
| 2002/0005993 | A1 | * | 1/2002 | Koiwai ....................... 359/700 |
| 2002/0141078 | A1 | * | 10/2002 | Koiwai et al. .............. 359/819 |

FOREIGN PATENT DOCUMENTS

| JP | 359087413 A | * | 5/1984 |
| JP | 7-191252 | | 7/1995 |

* cited by examiner

*Primary Examiner*—Ricky Mack
(74) *Attorney, Agent, or Firm*—Ostrolenk, Faber, Gerb & Soffen, LLP (57) ABSTRACT

In a lens barrel, a cam groove has a pair of wall surfaces. One of the wall surfaces, which is located on the side thereof where a rotary frame is extended by a cam follower coming into sliding contact with the wall surface, is formed at a small inclining angle. The other of the wall surfaces is formed at a large inclining angle. The cam follower has a shaft mounting portion implanted in a fixed frame and has an edge formed around the circumference surface of the shaft mounting portion at the end thereof. The surface of the cam follower, which is engaged and comes into sliding contact with the cam groove, is composed of a base end side taper surface and an extreme end side taper surface. The base end side taper surface is formed on the shaft mounting portion side, has a small inclining angle, and comes into sliding contact with one of the wall surfaces. The extreme end side taper surface has a large inclining angle and comes into sliding contact with the other of the wall surfaces. With this arrangement, in the lens barrel in which lens frames are coupled with each other by a cam mechanism arranged as described above, the cam mechanism can firmly couples the lens frames even if unintentional external force is applied to the lens barrel. This arrangement has wide versatility and does not make it difficult to mold the cam groove.

19 Claims, 9 Drawing Sheets

OPTICAL AXIS DIRECTION

LENS BARREL

This application claim benefit of Japanese Patent Application No. 2001-196952 filed on Jun. 28, 2001, the contents of which are incorporated by this reference.

BACKGROUND OF THE INVENTION

1. Field of the Invention

The present invention relates to a lens barrel of a camera, and the like, in which the lens barrel has a plurality of lens frames moving in an optical axis direction, and more particularly, to a lens barrel for firmly coupling lens frames with each other.

2. Description of the Related Art

Conventionally, in lens barrels of zoom lenses, and the like of cameras, lens frames are often coupled with each other through a cam mechanism composed of a cam groove and a cam follower to permit the smooth relative movement of the lens frames in the optical axis direction thereof.

A cam frame, in which the cam groove of the cam mechanism is disposed, is generally molded (injection molded) of a synthetic resin material, and the cross section of the cam groove has inclining surfaces that gradually open outward due to the restriction imposed when a mold is drafted. The cam follower is formed in a conical shape according to the inclining surfaces.

In the coupling of lens frames made by the cam mechanism composed of the cam groove and the cam follower, however, when a user drops a camera by mistake or when some kind or another shock or hit is applied to the camera from forward (from a subject side), there is a possibility that the cam follower gets over an inclining surface of the cam groove and is removed therefrom.

The removal of the cam follower from the cam groove is liable to arise when both the walls of the cam groove have a large inclining angle. When the inclining angle is reduced to make the removal of the cam follower from the cam groove difficult, it is difficult to draft a mold from a molded cam frame. Further, when the diameter of a lens frame is reduced to decrease the size of a camera, it is difficult to draft a mold from a molded cam frame because a gradient lead angle is made tight even if the moving amount of cam lift is unchanged.

To cope with the above problem, Japanese Unexamined Patent Application Publication No. 7-191252 discloses a technology for setting the inclining angle of a pair of confronting inclining surfaces of each of cam grooves to a small angle in a photographing region and to a large angle in a collapsed region and for forming a plurality of taper surfaces on a cam follower according to the inclining angles of the respective cam grooves.

In this conventional art, however, a cam pin must have a plurality of taper angles in a circumferential direction. Thus, when the cam groove is arranged as a non-linear cam groove, the cam pin cannot cover all the regions of the non-linear cam groove, which greatly restricts the employment of the conventional art.

Accordingly, it is an object of the present invention, which was made in view of the above circumstances, to provide a lens barrel in which lens frames are coupled with each other making use of a cam mechanism. The lens barrel has wide versatility, does not make it difficult to mold cam grooves, and can firmly couple the lens frames with each other by the cam mechanism even if unintentional external force is applied to the lens barrel.

SUMMARY OF THE INVENTION

A lens barrel has a first frame including a cam groove having a first surface and a second surface that confront each other with the first surface which is not in parallel with the second surface, and has a second frame including a cam follower that has a first outer circumferential surface, which comes into sliding contact with the first surface, that has a second outer circumferential surface, which comes into sliding contact with the second surface at a depth different from that of the first outer circumferential surface in the depth of the cam groove, and that is put between the surfaces which are not in parallel with each other, and the second frame moves relatively to the first frame.

The above and other objects, features and advantages of the invention will become more clearly understood from the following description referring to the accompanying drawings.

DETAILED DESCRIPTION OF PREFERRED EMBODIMENT

A first embodiment of the present invention will be described with reference to FIGS. 1 to 4.

Figure 1:
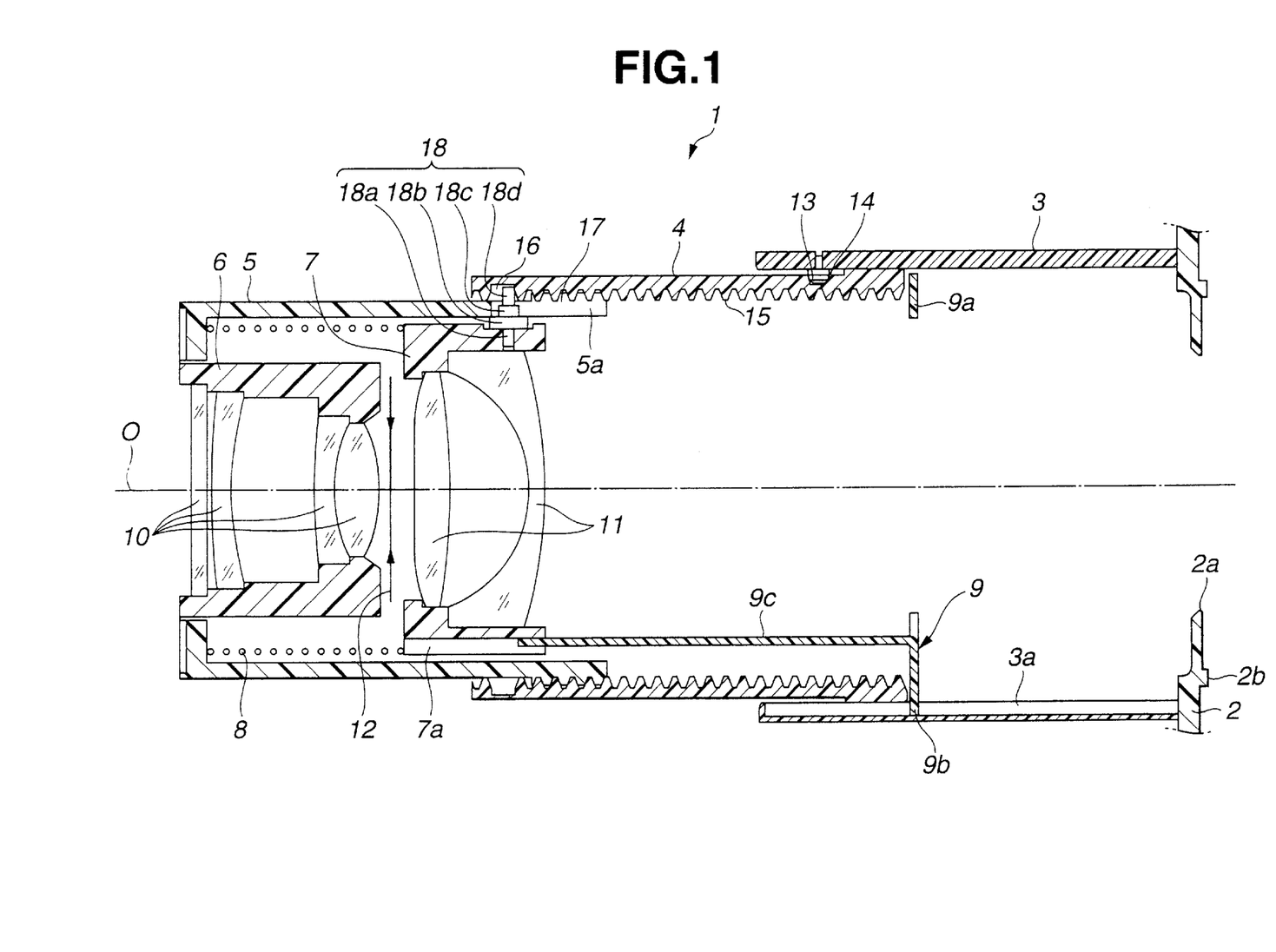
FIG. 1 is a longitudinal sectional view of a lens barrel acting as a photographing lens disposed in a camera according to a first embodiment of the present invention taken along the optical axis thereof.

In FIG. 1, reference numeral 1 denotes a lens barrel composed of a synthetic resin material. The lens barrel 1 can perform zooming and is composed of a fixed frame 3 acting as a second frame, a rotary frame 4 acting as a first frame, a zoom frame 5, a first group frame 6, a second lens group 11, a second group frame 7, and a linear-movement key 9. The fixed frame 3 is fixed so as to cover the outside of the aperture 2a of a camera main body 2; the rotary frame 4 is supported so as to rotate as well as to advance and retract with respect to the fixed frame 3 and is driven in rotation by a lens frame drive unit (not shown); the zoom frame 5 is supported by the rotary frame 4 so as to rotate as well as to advance and retract relatively to the rotary frame 4; the first group frame 6 holds a first lens group 10; and the second group frame 7 holds a shutter 12. Note that, in FIG. 1, reference numeral 2b denotes the film rail surface of the camera main body 2.

The fixed frame 3 has cam followers 13 disposed around the inner surface thereof at a plurality of locations (for example, two locations) on a front side (on the side near to a subject) thereof as well as has a linear-movement guide groove 3a formed thereon for guiding the linear movement of the linear-movement key 9 in an optical axis O direction.

The rotary frame 4 has spiral and non-linear cam grooves 14 formed around the outer cylindrical circumferential surface thereof. Each of the cam grooves 14 has a pair of confronting wall surfaces each having a different inclining angle as described below, and a cam follower 13 is engaged and comes into sliding contact with a cam groove 14.

Further, a helicoid female thread 15 is formed around the inner circumferential surface of the rotary frame 4, and further a plurality of (for example, three) cam grooves 16, which intersect and are superimposed on the helicoid female thread 15 and incline spirally in the optical axis direction, are formed around the inner circumferential surface of the rotary frame 4.

When the rotary frame 4 is driven in rotation by the lens frame drive unit (not shown), it is extended from a collapsed position to a predetermined photographing position while rotating with respect to the fixed frame 3.

The linear-movement key 9 includes a projecting unit 9b and a key unit 9c. The projecting unit 9b projects in a circumferential direction from the base end portion 9a, which is formed in a ring shape, of the linear-movement key 9 and is slidably inserted into the linear-movement guide groove 3a of the fixed frame 3. The key unit 9c extends forward from the base end portion 9a through the lens barrel 1, fits in and slides along a linear-movement groove 7a formed in the second group frame 7, and guides the linear movement of the second group frame 7 by prohibiting the rotation thereof.

The linear-movement key 9 advances and retracts in the optical axis direction integrally with the rotary frame 4 while the rotary frame 4 rotates relatively to the linear-movement key 9 in a state in which the linear-movement key 9 is guided by a known support mechanism so as to move linearly without rotating with respect to the fixed frame 3.

The zoom frame 5 is formed in a cylindrical shape and has a helicoid male thread 17 formed around the outer circumferential surface in the vicinity of the rear end side thereof. The helicoid male thread 17 is threaded with the helicoid female thread 15 of the rotary frame 4.

The zoom frame 5 has guide grooves 5a formed at three rear positions of the cylindrical portion thereof. The guide grooves 5a slenderly pass through the zoom frame 5 from the rear end thereof along the optical axis direction.

The first group frame 6 is accommodated in and secured to the inside of the zoom frame 5 at the front end thereof (on the side near to the subject). With this arrangement, when the rotary frame 4 is rotated, the zoom frame 5 can advance and retract relatively to the rotary frame 4 because the zoom frame 5 is regulated not to rotate by the guide grooves 5a formed in the second group frame 7 through three cam followers 18 and is further guided to move linearly. These cam followers 18 are disposed around the same outside circumferential surface of the second frame group 7 at substantially the same intervals.

An urging spring 8, which is a compressed spring, is inserted between the extreme end surface of second frame group 7 and the inner extreme end surface of the zoom frame 5 and is urged at all times in a direction where the extreme end surface of the second frame group 7 is separated from the inner extreme end surface of the zoom frame 5.

The second frame group 7 is guided by the key unit 9c of the linear-movement key 9 so as to move linearly and is moved back and forth relatively to the rotary frame 4 by the cam followers 18 that move along the cam grooves 16 of the rotary frame 4.

Each of the three cam followers 18 is formed in a three-stepped shape and has a shaft portion 18a, an optical axis adjusting portion 18b, a linear movement guide sliding contact portion 18c, and a cam groove sliding contact portion 18d each having a different diameter. The shaft portion 18a is implanted in, for example, a mounting hole of the second group frame 7 so as to be optionally removed therefrom; the optical axis adjusting portion 18b is formed in a predetermined thickness so as to adjust the gap between the inner surface of the zoom frame 5 and the outer surface of the second group frame 7 (the optical axis of the second lens group 11); the linear movement guide sliding contact portion 18c is arranged such that the side surface thereof is engaged and comes into sliding contact with the guide groove 5a of the zoom frame 5; and the cam groove sliding contact portion 18d is arranged such that the side surface thereof is engaged and comes into sliding contact with the cam grooves 16 of the rotary frame 4.

Next, the cam followers 13 of the fixed frame 3 and the cam grooves 14 around the surface of the rotary frame 4 will be described in detail.

Figure 2:
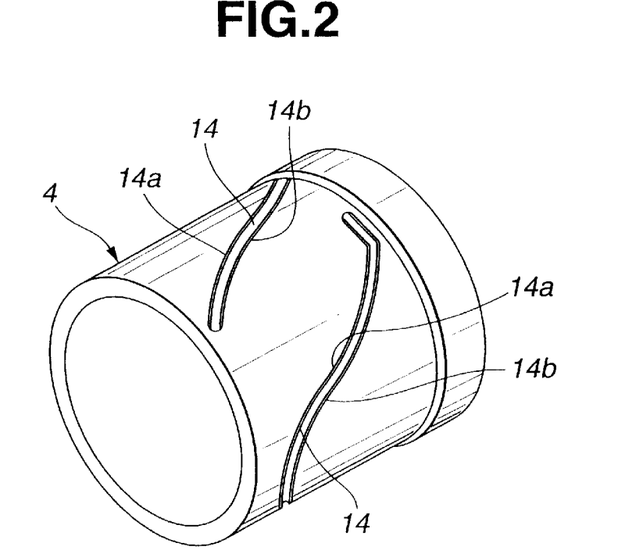
FIG. 2 is a perspective view of a rotary frame according to the first embodiment of the present invention.

As shown in the perspective view of the rotary frame 4 in FIG. 2, the cam grooves 14 are formed around the surface of the rotary frame 4 non-linearly. As shown in the enlarged sectional view of FIG. 3, each of the cam grooves 14 has a pair of confronting wall surfaces. One of the wall surfaces, that is, a wall surface 14a, with which a cam follower 13 comes into sliding contact so as to extend the rotary frame 4 (the left side wall in FIG. 3), is formed at a small inclining angle (in this embodiment, an inclining angle with respect to a surface perpendicular to the optical axis O) $\theta1$ as a first surface or as a first inclining surface. Further, the other wall surface 14b of each cam groove 14 is formed at a large inclining angle $\theta2$ as a second surface or as a second inclining surface.

Figure 3:
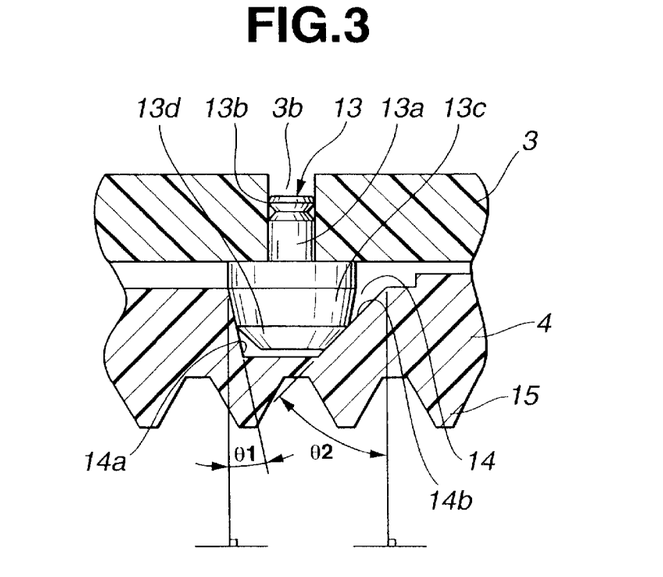
FIG. 3 is an enlarged sectional view of a portion where the rotary frame is coupled with a fixed frame by a cam mechanism according to the first embodiment of the present invention.
Figure 4:
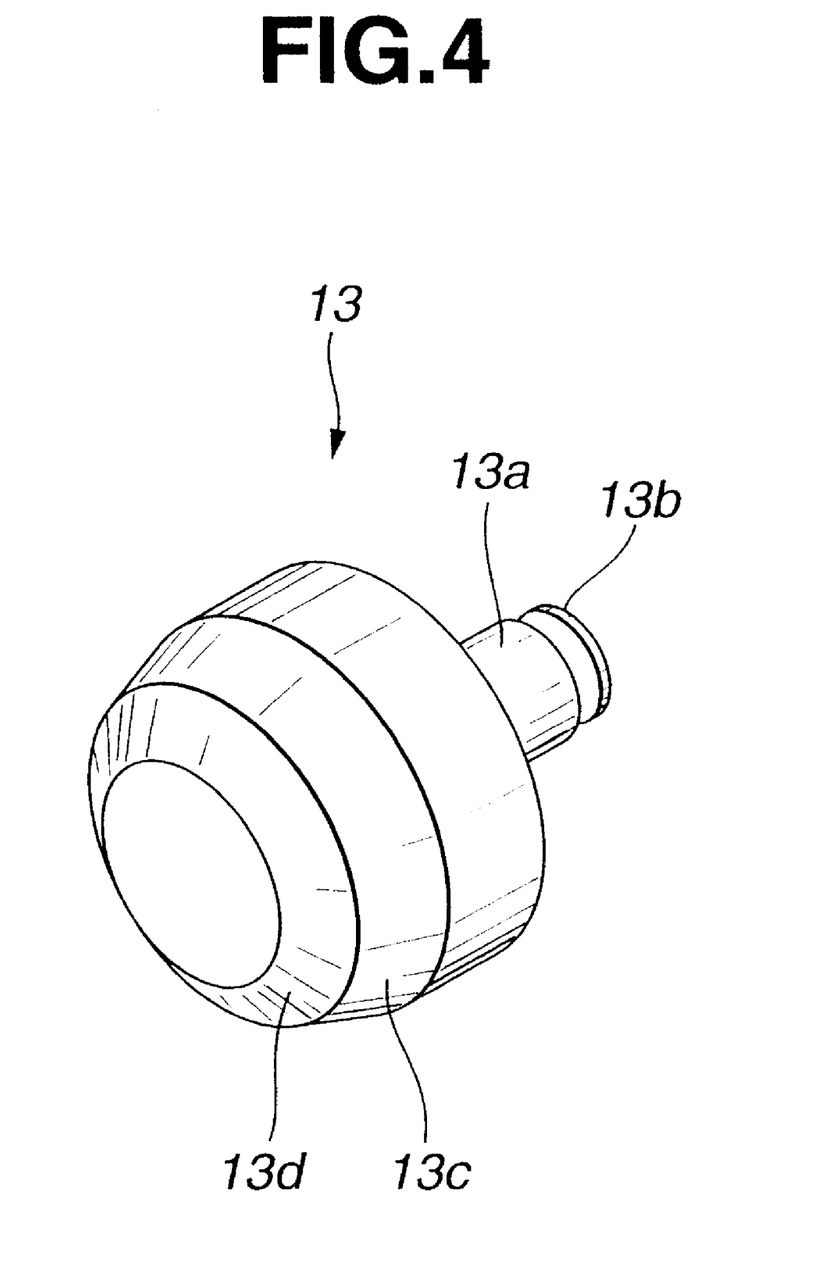
FIG. 4 is a perspective view of a cam follower according to the first embodiment of the present invention.

In contrast, as shown in FIGS. 3 and 4, each cam follower 13 of the fixed frame 3 has a shaft mounting portion 13a that is implanted in an implanting hole 3b formed through the fixed frame 3. The fixing shaft portion 13a has an edge portion 13b formed on the circumferential surface thereof at the end thereof. When a load is applied to the cam follower 13 in a direction where it is extracted from the implanting hole 3b, the edge portion 13b is caught by the surface of the implanting hole 3b and prevents the extraction of the cam followers 13.

The outer circumferential surface of the cam follower 13, which is engaged and comes into sliding contact with the cam groove 14, is composed of two-stepped taper surfaces each having a different inclining angle. That is, a base end side taper surface 13c acting as a first outer circumferential surface or a first taper surface located near to the shaft mounting portion 13a is formed as a taper surface that has a small inclining angle θ1 and comes into sliding contact with the one of the wall surfaces, that is, the wall surface 14a. Further, an extreme end side taper surface 13d acting as a second outer circumferential surface or a second taper surface is formed as a taper surface that has a large inclining angle θ2 and comes into sliding contact with the other of the wall surfaces, that is, the wall surface 14b.

As described above, the fixed frame 3 is coupled with the rotary frame 4 through the cam followers 13 of the fixed frame 3 and the cam grooves 14 on the surface of the rotary frame 4. Thus, when a load is applied in a direction where the rotary frame 4 is moved toward the camera main body 2 as a result that a user drops a camera by mistake or that some kind or another shock or hit is applied to the camera from forward (from the subject side), the wall surface 14a, which has the small angle θ1, of the cam groove 14 strongly presses the base end side taper surface 13c of the cam follower 13.

It is difficult for the base end side taper surface 13c of the cam follower 13 to get over the wall surface 14a because it has the small inclining angle θ1. With this arrangement, the fixed frame 3 can be firmly coupled with the rotary frame 4 by this cam mechanism.

When the rotary frame 4 is molded, a large degree of freedom can be secured in a mold draft direction, and the like because the wall surface 14b of the cam groove 14 is formed at the large inclining angle θ2, thereby a mold can be easily drafted.

Further, since the cam groove 14 can achieve the above effect by changing the inclining angle of one of the pair of confronting wall surfaces from the inclining angle of the other of them, this arrangement can be easily employed even in a non-linear cam, and the like.

Next, a second embodiment of the present invention will be described with reference to FIGS. 5 and 6. Note that, since the second embodiment is substantially similar to the first embodiment except that cam grooves are formed in a fixed frame 3 and cam followers are disposed in a rotary frame 4, the detailed description thereof is omitted.

Figure 5:
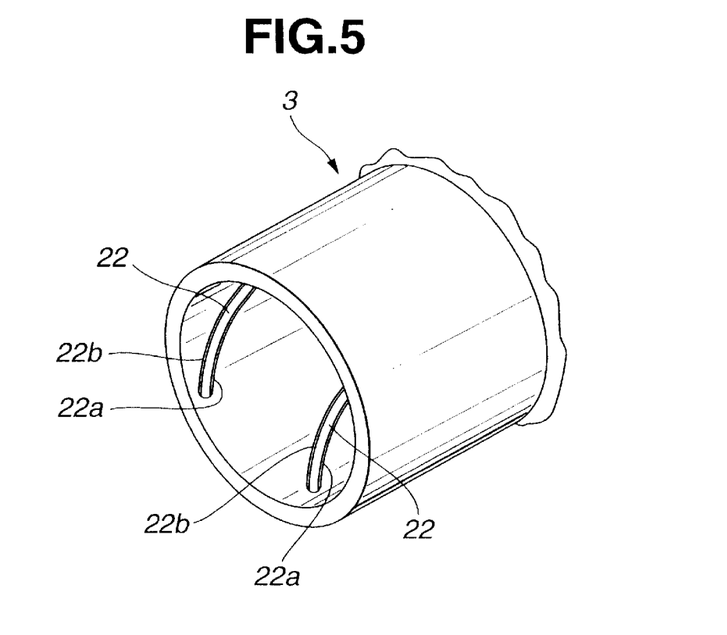
FIG. 5 is a perspective view of a fixed frame according to a second embodiment of the present invention.

That is, as shown in FIG. 5, the fixed frame 3 has spiral and non-linear cam grooves 22 formed around the inner surface thereof. Each of the cam grooves 22 has a pair of confronting wall surfaces each having a different inclining angle as described below. Then, cam followers 21 are implanted around the outer circumferential surface of the rotary frame 4 at a plurality of positions (for example, two positions) on the side thereof near to a camera main body 2, and are engaged and come into sliding contact with the cam grooves 22.

Figure 6:
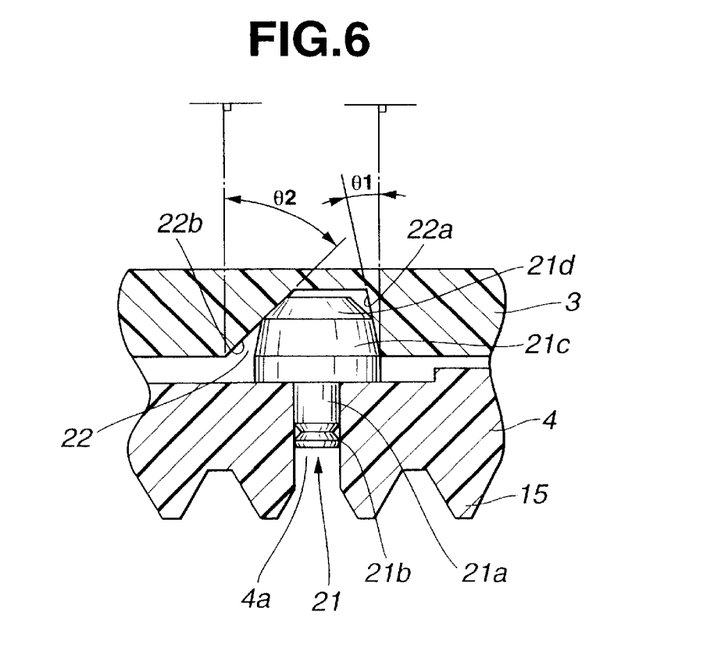
FIG. 6 is an enlarged sectional view of a portion where the fixed frame is coupled with a rotary frame by a cam mechanism according to the second embodiment of the present invention.

As shown in the enlarged sectional view of FIG. 6, each of the cam grooves 22 has the pair of confronting wall surfaces. One of the pair of wall surfaces, that is, a wall surface 22a, with which a cam follower 21 comes into contact so as to extend the rotary frame 4 (the right side wall in FIG. 6), is formed at a small inclining angle (in this embodiment, an inclining angle with respect to a surface perpendicular to an optical axis O) θ1. Whereas, the other of the confronting wall surfaces, that is, a wall surface 22b is formed at a large inclining angle θ2.

In contrast, each of the cam followers 21 of the rotary frame 4 has a shaft mounting portion 21a that is implanted in an implanting hole 4a formed in the rotary frame 4. Then, the shaft mounting portion 21a has an edge portion 21b formed on the circumferential surface at the end thereof. When a load is applied to the cam follower 21 in a direction where it is extracted from the implanting hole 4a, the edge portion 21b is caught by the surface of the implanting hole 4a and prevents the extraction thereof.

The surface of the cam follower 21, which is engaged and comes into sliding contact with the cam groove 22, is composed of two-stepped taper surfaces each having a different inclining angle. That is, a base end side taper surface 21c on the shaft mounting portion 21a side is formed as a taper surface that has a small inclining angle θ1 and comes into sliding contact with the wall surface 22a. Further, an extreme end side taper surface 21d of cam follower 21 is formed as a taper surface that has a large inclining angle θ2 and comes into sliding contact with the other wall surface 22b.

As described above, according to the second embodiment, the fixed frame 3 is coupled with the rotary frame 4 through the cam grooves 22 of the fixed frame 3 and the cam followers 21 around the surface of the rotary frame 4. Thus, when a load is applied in a direction where the rotary frame 4 is moved toward the camera main body 2 as a result that a user drops a camera by mistake or that some kind or another shock or hit is applied to the camera from forward (from a subject side), the base end side taper surface 21c of the cam follower 21 strongly presses the wall surfaces 22a, which has the small angle θ1, of the cam groove 21.

it is difficult for the base end side taper surface 21c of the cam follower 21 to get over the wall surface 22a because the wall surface 22a has the small inclining angle θ1. With this arrangement, the fixed frame 3 can be firmly coupled with the rotary frame 4 by this cam mechanism.

When the rotary frame 4 is molded, a large degree of freedom can be secured in a mold draft direction, and the like because the wall surface 22b of the cam groove 22 is formed at the large inclining angle θ2, thereby a mold can be easily drafted.

Further, since the cam groove 22 can achieve the above effect by changing the inclining angle of one of the pair of confronting wall surfaces from the inclining angle of the other of them, this arrangement can be easily employed in a non-linear cam, and the like, and has extremely wide versatility.

Next, a third embodiment of the present invention will be described with reference to FIGS. 7 to 11. Note that, since the third embodiment is substantially similar to the first embodiment except that cam grooves are formed in a fixed frame 3 and cam followers are disposed in a rotary frame 4, the detailed description thereof is omitted.

Figure 7:
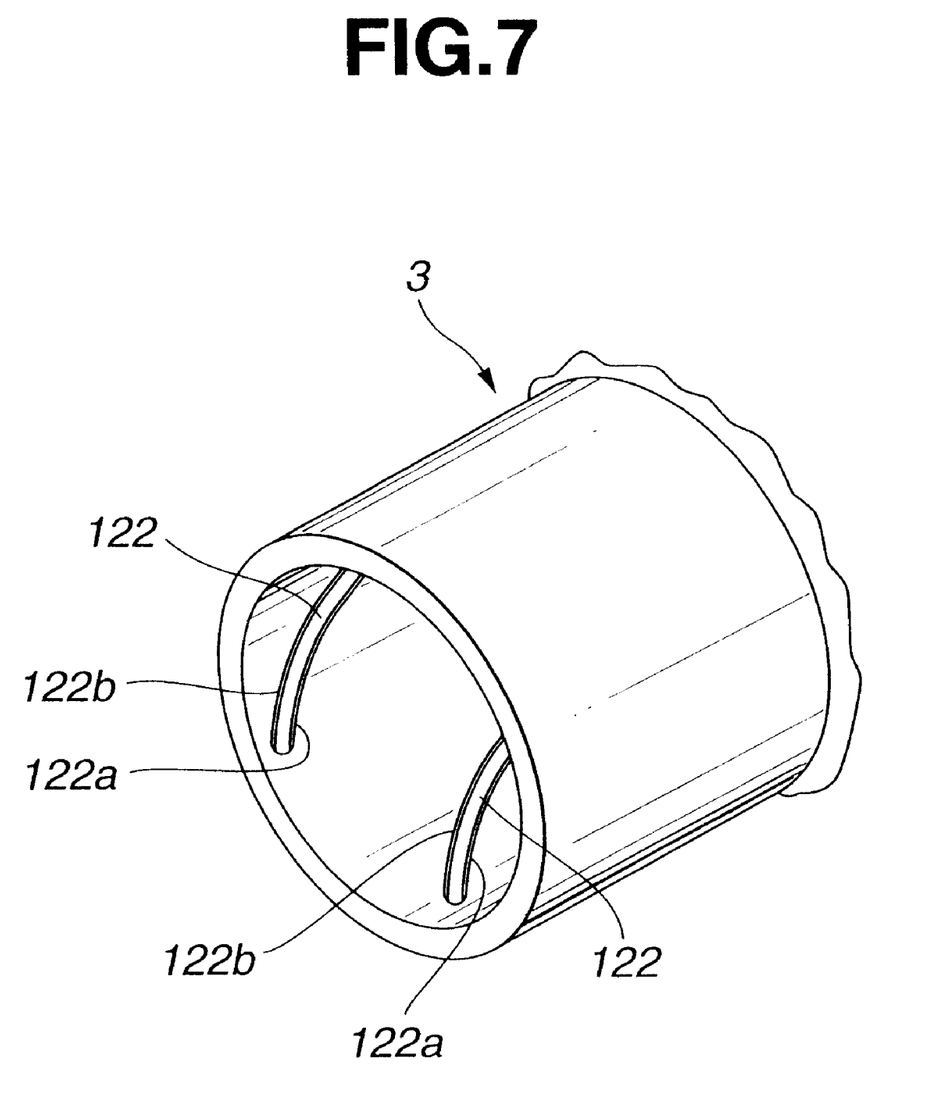
FIG. 7 is a perspective view of a fixed frame according to a third embodiment of the present invention.

That is, as shown in FIG. 7, the fixed frame 3 has spiral and non-linear cam grooves 122 formed around the inner surface thereof. Each of the cam grooves 122 has a pair of confronting wall surfaces each having a different inclining angle as described below. Then, cam followers 121 are implanted around the outer circumferential surface of the rotary frame 4 at plurality of positions (for example, two positions) on the side thereof near to a camera main body 2, and are engaged and come into sliding contact with the cam grooves 122.

Figure 8:
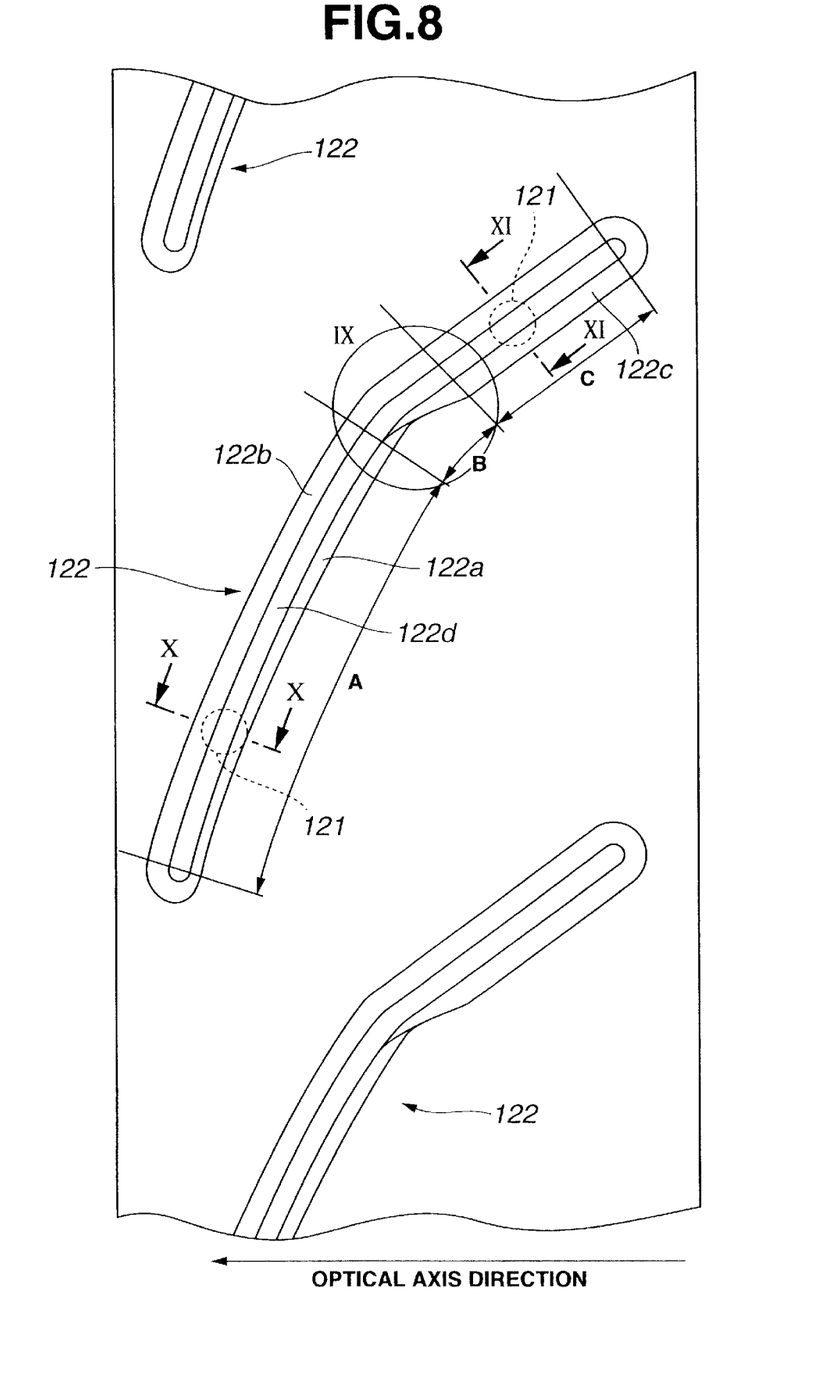
FIG. 8 is a developed elevational view of the fixed frame on the inside diameter side thereof according to the third embodiment of the present invention.

As shown in the developed elevational view of the fixed frame on the inside diameter side thereof in FIG. 8, each of the cam grooves 122 has a zoom region A in which photographing is possible, a collapsing region C in which the overall length of a lens barrel is collapsed, and a change-over region B located between the zoom region A and the collapsing region C.

The collapsing region C is a region that is used only when photographing is finished and the lens barrel shifts to an accommodating state. Thus, the cam followers 121 do not stop in a midway of the collapsing region C and are scarcely located therein. That is, in the collapsing region C, the cam follower 121 rarely have a chance of being subjected to shock and external force. The rotary frame 4 abuts the fixed frame 3 at the end surfaces thereof at a collapsing end (not shown), which prevents the removal of the cam followers 121 from the cam grooves 122.

Figure 9:
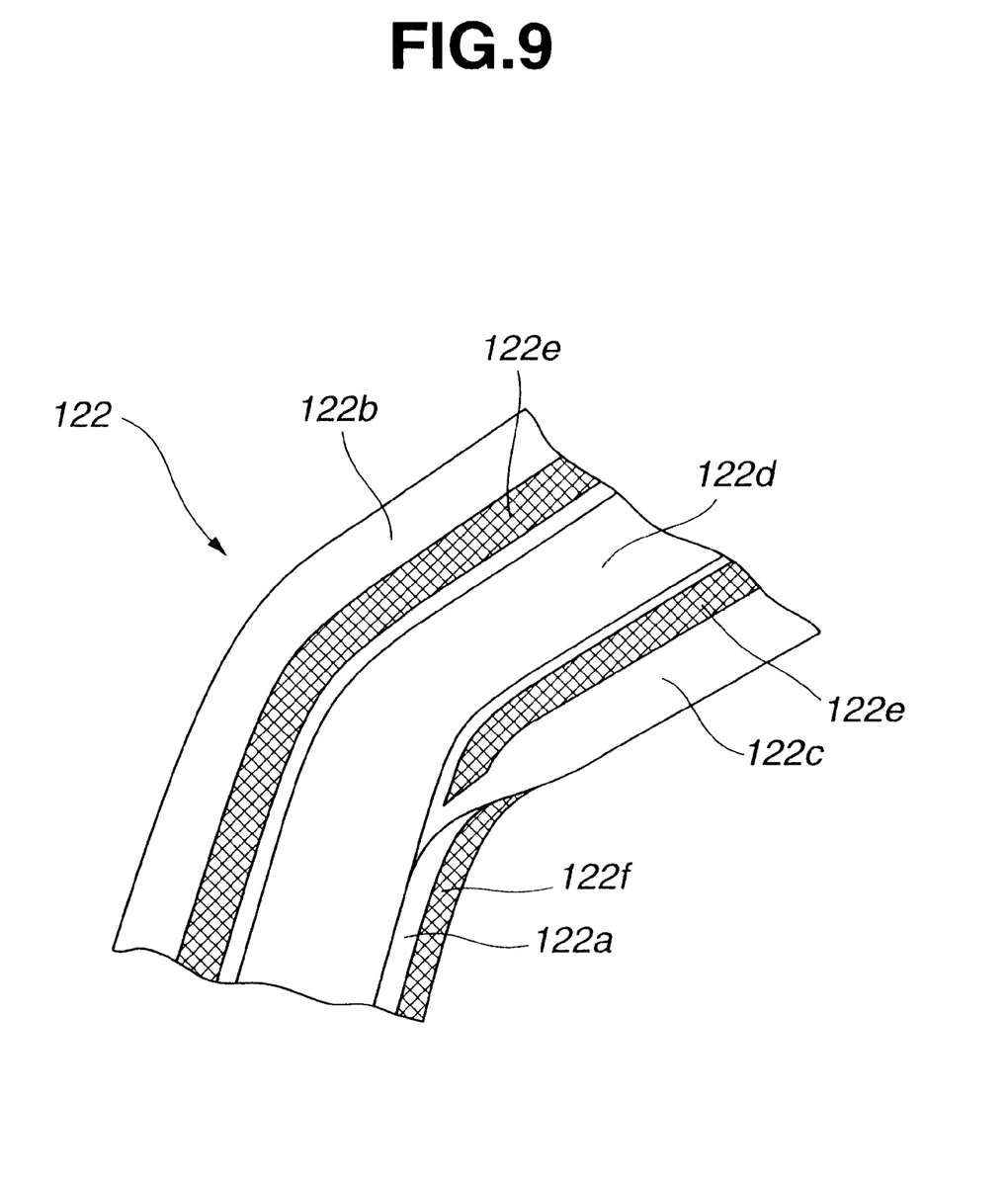
FIG. 9 is an enlarged view of the portion IX of the fixed frame in FIG. 8 according to the third embodiment of the present invention.

In the change-over region B where the inclining angles of the wall surfaces of each cam groove 122 change from the zoom region A to the collapsing region C, the inclining angle of a wall surface 122b on a subject side is set to a constant inclining angle θ2 from the zoom region A to the collapsing region C, as shown in FIG. 9. Then, a wall surface 122a that confronts the wall surface 122b on the subject side has an inclining angle θ1 in the zoom region A and is arranged as a wall surface 122c having a large inclining angle θ3, which permits a mold to be drafted easily, in the collapsing region C.

Further, in the change-over region B, the wall surface 122b, with which the taper surface 121d of a cam follower 121 comes into contacts, is gently connected from the region A to the region C, and the wall surface 122a is connected to the wall surface 122c while gently changing.

Note that the slanted region 122e in the wall surface 122b shown in FIG. 9 is a portion with which the taper surface 121d of the cam follower 121 comes into sliding contact, and the slanted region 122f in the wall surface 122a is a portion with which the taper surface 121c of the cam follower 121 comes into sliding contact.

Figure 10:
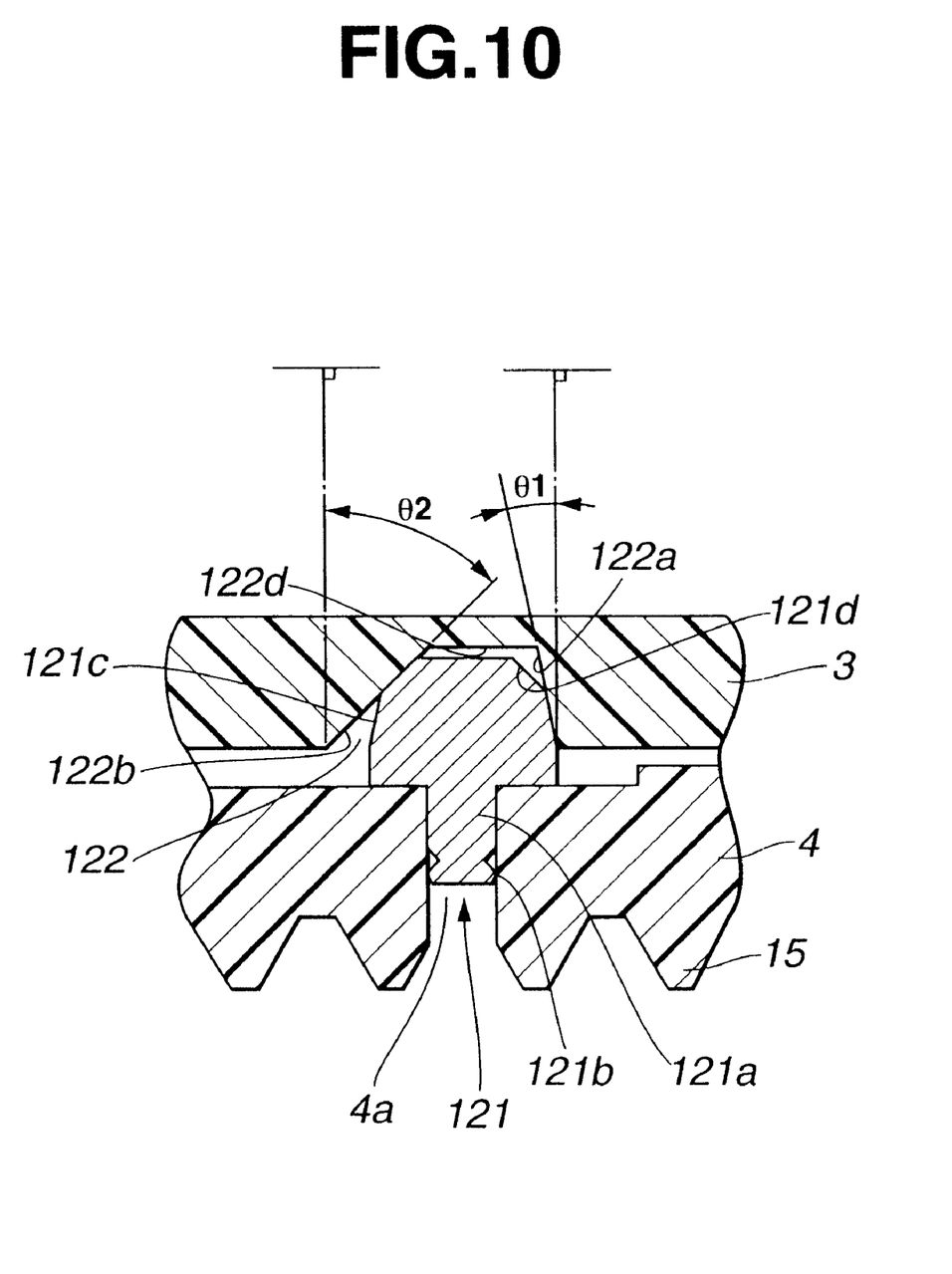
FIG. 10 is a sectional view of the fixed frame taken along the line X—X in FIG. 8 according to the third embodiment of the present invention.
Figure 11:
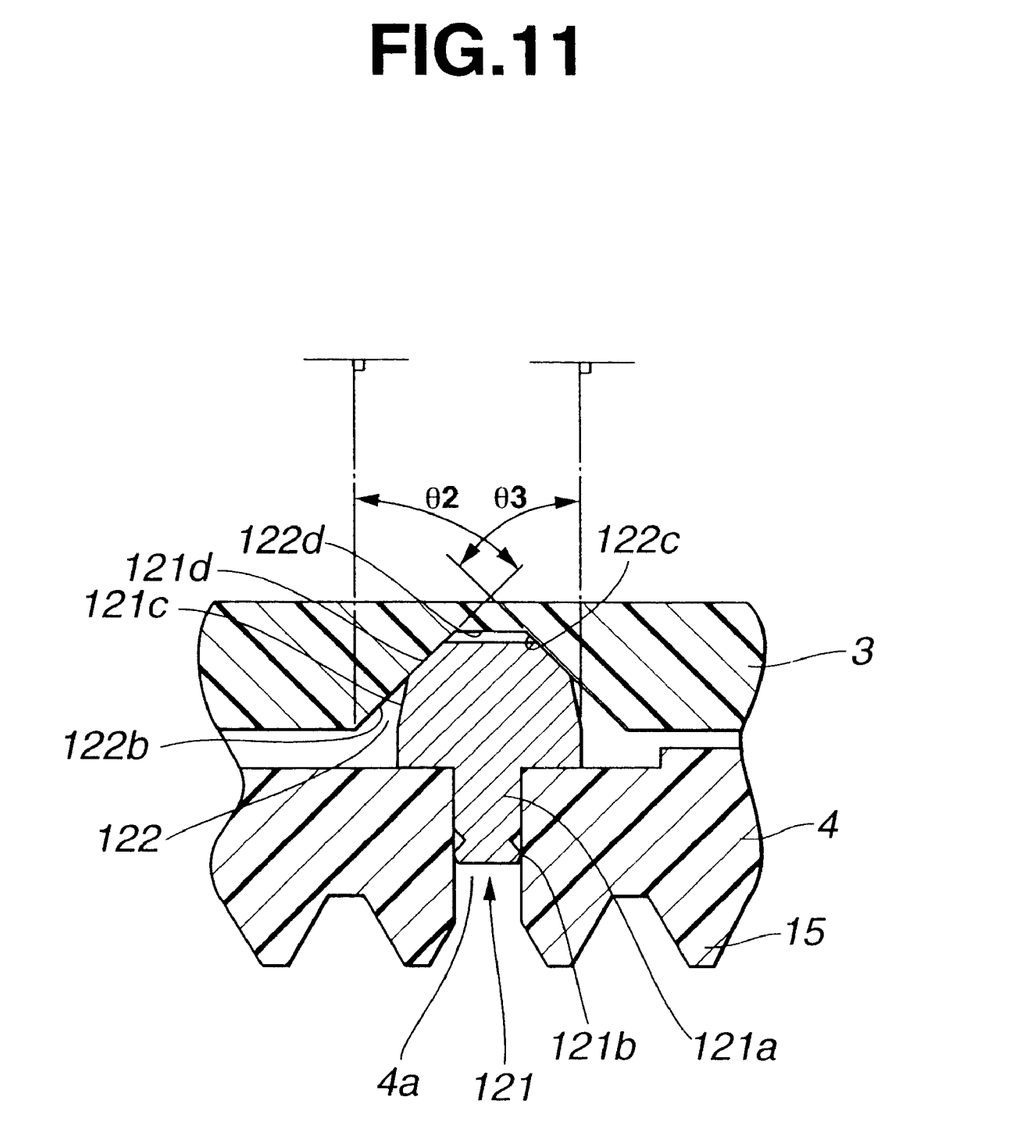
FIG. 11 is a sectional view of the fixed frame taken along the line XI—XI in FIG. 8 according to the third embodiment of the present invention.

As shown in the enlarged sectional view of FIG. 10, one of the pair of confronting wall surfaces, that is, the wall surface 122a, with which a cam follower 121 comes into sliding contact so as to extend the rotary frame 4 (the right side wall in FIG. 10), is formed at a small inclining angle (in this embodiment, an inclining angle with respect to a surface perpendicular to an optical axis O) θ1. Whereas, the other of the pair of confronting wall surfaces, that is, the wall surface 122b is formed at the large inclining angle θ2.

In contrast, each of the cam followers 121 of the rotary frame 4 has a shaft mounting portion 121a that is implanted in an implanting hole 4a formed in the rotary frame 4. Then, the shaft mounting portion 121a has an edge portion 121b formed on the circumferential surface at the end thereof. When a load is applied the cam follower 121 in a direction where it is extracted from the implanting hole 4a, the edge portion 121b is caught by the surface of the implanting hole 4a and prevents the extraction thereof.

The surface of the cam follower 121, which is engaged and comes into sliding contact with the cam groove 122, is composed of two-stepped taper surface taper surfaces each having a different inclining angle. This is, the base end side taper surface 121c on the shaft mounting portion 121a side is formed as a taper surface that has the small inclining angle θ1 and comes into sliding contact with the wall surface 122a.

Further, the extreme end side taper surface 121d of the cam follower 121 is formed as a taper surface that has the large inclining angle θ2 and comes into sliding contact with the other wall surface 122b.

As described above, according to the third embodiment, the fixed frame 3 is coupled with the rotary frame 4 through the cam grooves 122 of the fixed frame 3 and the cam followers 121 around the surface of the rotary frame 4. Thus, when a load is applied in a direction where the rotary frame 4 is moved toward the camera main body 2 as a result that a user drops a camera by mistake or that some kind or another shock or hit is applied to the camera from forward (from a subject side) in the zoom region A having a high frequency of use, the base end side taper surfaces 121c of the cam followers 121 strongly presses the wall surfaces 122a, which have the small angle θ1, of the cam groove 122.

It is difficult for the base end side taper surface 121c of the cam follower 121 to get over the wall surface 122a because the wall surface 122a has the small inclining angle θ1. With the arrangement, the fixed frame 3 can be firmly coupled with the rotary frame 4 by this cam mechanism.

When the rotary frame 4 is molded, a large degree of freedom can be secured in a draft direction, and the like because the wall surface 122b of the cam groove 122 is formed at the large inclining angle θ2, thereby a mold can be easily drafted.

Further, both the wall surfaces have the large inclining angles θ2 and θ3 in the collapsing region C of the wall surface 122b, which further increases the degree of freedom of the mold and contributes to cost reduction.

Furthermore, since the cam groove 122 can achieve the above effect by changing the inclining angle of one of the confronting wall surfaces from that of the other thereof, this arrangement can be easily employed in a non-linear cam, and the like, and has extremely wide versatility.

As described above, according to the present invention, in the lens barrel in which the lens frames are coupled with each other by the cam mechanism, the cam mechanism can firmly couple the lens frames even if unintentional external force is applied to the lens barrel. The lens barrel arranged as described above has wide versatility and does not make it difficult to mold the cam grooves.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A lens barrel comprising:
a first frame including a cam groove having a first surface and a second surface that confront each other with the first surface formed of a surface that is not in parallel with the second surface; and
a second frame including a cam follower that has a first outer circumferential surface, which comes into sliding contact with the first surface, that has a second outer circumferential surface, which comes into sliding contact with the second surface at a depth different from that of the first outer circumferential surface in the depth of the cam groove, and that is put between the surfaces which are not in parallel with each other,
wherein the second frame moves relatively to the first frame.

2. A lens barrel according to claim 1, wherein the cam groove is formed around the outer circumferential surface of the first frame, and the cam follower is disposed around the inner circumferential surface of the second frame.

3. A lens barrel according to claim 1, wherein the cam groove is formed around the inner circumferential surface of the first frame, and the cam follower is disposed around the outer circumferential surface of the second frame.

4. A lens barrel according to claim 1, wherein at least one of the first and second surfaces is arranged as an inclining surface that inclines with respect to a line perpendicular to the optical axis of the lens barrel on a section taken along a surface including the optical axis.

5. A lens barrel according to claim 1, wherein each of the first and second surfaces is arranged as an inclining surface that inclines with respect to a line perpendicular to the optical axis of the lens barrel on a section taken along a surface including the optical axis.

6. A lens barrel according to claim 5, wherein one of the first and second surfaces inclines more moderately than the other surface.

7. A lens barrel according to claim 1, wherein at least one of the first and second outer circumferential surfaces of the cam follower is arranged as a taper surface.

8. A lens barrel according to claim 1, wherein the cam follower has a shaft mounting portion implanted in the second frame, and the shaft mounting portion has an edge formed around the circumferential surface thereof.

9. A lens barrel according to claim 1, wherein the first frame has another cam groove that is different from the cam groove and is formed continuously from the cam groove so that the another cam groove is engaged with the cam follower so as to be in contact with only one of the outer circumferential surfaces thereof.

10. A lens barrel comprising:
    a first frame including a cam groove having a first surface acting as a sliding surface and a second surface acting as a sliding surface formed of an inclining surface that inclines with respect to the first surface in confrontation therewith; and
    a second frame including a cam follower engaged with the cam groove so as to be put between the sliding surfaces, having a first outer circumferential surface, which comes into sliding contact with the first surface and having a second outer circumferential surface, which comes into sliding contact with the second surface at a depth different from that of the first outer circumferential surface in the depth of the cam groove,
    wherein the second frame moves relatively to the first frame.

11. A lens barrel according to claim 10, wherein the cam groove is formed around the outer circumferential surface of the first frame, and the cam follower is disposed around the inner circumferential surface of the second frame.

12. A lens barrel according to claim 10, wherein the cam groove is formed around the inner circumferential surface of the first frame, and the cam follower is disposed around the outer circumferential surface of the second frame.

13. A lens barrel according to claim 10, wherein each of the first and second surfaces is arranged as an inclining surface that inclines with respect to a line perpendicular to the optical axis of the lens barrel on a section taken along a surface including the optical axis.

14. A lens barrel according to claim 13, wherein one of the first and second surfaces inclines more moderately than the other surface.

15. A lens barrel according to claim 10, wherein at least one of the first and second surfaces is arranged as an inclining surface that inclines with respect to a line perpendicular to the optical axis of the lens barrel on a section taken along a surface including the optical axis.

16. A lens barrel according to claim 10, wherein the first surface of the cam groove on the side thereof, which is pressed by the cam follower engaged with and coming sliding contact with the cam groove, has an inclining angle formed smaller than that of the second surface in order to extend the length of the lens barrel composed of the first and second frames.

17. A lens barrel according to claim 10, wherein the first frame has another cam groove that is different from the cam groove and is formed continuously from the cam groove so that the another cam groove is engaged with the cam follower so as to be in contact with only one of the outer circumferential surfaces thereof.

18. A lens barrel according to claim 10, wherein at least one of the first and second outer circumferential surfaces of the cam follower is arranged as a taper surface.

19. A lens barrel according to claim 10, wherein the cam follower has a shaft mounting portion implanted in the second frame, and the shaft mounting portion has an edge formed around the circumferential surface thereof.

* * * * *